US005506489A

United States Patent [19]
Abbott et al.

[11] Patent Number: 5,506,489
[45] Date of Patent: Apr. 9, 1996

[54] INDUCTIVE COUPLER HAVING A TACTILE FEEL

[75] Inventors: Russell M. Abbott, Riverside; George R. Woody, Redondo Beach, both of Calif.

[73] Assignee: Hughes Aircraft Company, Los Angeles, Calif.

[21] Appl. No.: 237,562

[22] Filed: Apr. 29, 1994

[51] Int. Cl.$^6$ .................................................. H02J 7/00
[52] U.S. Cl. .................................................. 320/21; 320/2
[58] Field of Search ........................................ 320/2, 21

[56] References Cited

U.S. PATENT DOCUMENTS

| | | | |
|---|---|---|---|
| 3,938,018 | 2/1976 | Dahl | 320/2 |
| 4,347,472 | 8/1982 | Lemelson | 320/2 |
| 4,436,970 | 3/1984 | Swisher | 200/61.56 |
| 4,496,896 | 1/1985 | Melocik et al. | 320/2 |
| 4,800,328 | 1/1989 | Bolger et al. | 320/2 |
| 4,843,852 | 7/1989 | Foshee et al. | 70/367 |
| 5,070,293 | 12/1991 | Ishii et al. | 30/2 |
| 5,157,319 | 10/1992 | Klontz et al. | 320/2 |
| 5,180,050 | 1/1993 | Rada et al. | 200/329 |
| 5,264,776 | 11/1993 | Hulsey | 320/2 |

*Primary Examiner*—Kristine L. Peckman
*Attorney, Agent, or Firm*—Leonard A. Alkov; W. K. Denson-Low

[57] ABSTRACT

An inductive charging apparatus for use in charging a battery of an electric vehicle, for example, that provides for a tactile feel. The inductive charging apparatus comprises an inductive charging coupler and a charge port disposed in the electric vehicle and coupled to the battery of the electric vehicle. The charging coupler comprises a center magnetic core, and a primary winding disposed around the center magnetic core. A charger cable is coupled between the primary winding and an external power source for coupling energy to the charging coupler. A coupler housing is provided that has two mating coupler halves that are configured to provide a handle, and the mating coupler halves enclose the primary winding and the center magnetic core, and secures the charger cable in the handle. A plurality of indentations are formed in the side of the housing. The charge port has an opening into which the inductive charging coupler is inserted. The charge port comprises a ferrite core and a secondary winding disposed adjacent to the ferrite core that is coupled to the battery of the electric vehicle. A plurality of flexible fingers protrude from the opening that engage the indentations in the side of the housing of the coupler when the coupler is inserted into the charge port.

5 Claims, 1 Drawing Sheet

INDUCTIVE COUPLER HAVING A TACTILE FEEL

BACKGROUND

The present invention relates to inductive chargers, and more particularly, to inductive charging apparatus employing means for providing a tactile feel.

The assignee of the present invention designs, develops and manufactures inductive charging systems for use in charging electric batteries of electric vehicles, and the like. Previous inductive-type couplers developed by the assignee of the present invention use a complex movable closing core design that provides a tactile feel for a user.

The assignee of the present invention has developed a fixed core charging system. This charging system employs a charge port comprising ferrite windings and core that form a secondary of a transformer installed in an electric vehicle, and a charge coupler or probe comprising a primary winding and a core that form a primary of a transformer that is coupled to a power source and which is inserted into the charge port to charge the vehicle batteries. It is necessary to incorporate a tactile feel feature in the fixed core charging system, because it is not easy for a user to tell that the coupler has properly been in inserted into the charge port.

Therefore, it is an objective of the present invention to provide for inductive charging apparatus for use in charging electric vehicles, and the like, incorporating means for providing a tactile feel for a user.

SUMMARY OF THE INVENTION

In order to meet the above and other objectives, the present invention is an inductive charging system for use in charging a battery of an electric vehicle, for example. The inductive charging system comprises an inductive charging coupler and a charge port disposed in the electric vehicle that is coupled to a propulsion battery thereof. The charging coupler comprises a center magnetic core, and a primary winding disposed around the center magnetic core. A charger cable is coupled between the primary winding and an external power source for coupling energy to the charging coupler. A coupler housing is provided that has two mating coupler halves that are configured to provide a handle, and the mating coupler halves enclose the primary winding and the center magnetic core, and secures the charger cable in the handle. A conductive plastic strip is disposed along an exterior portion of the coupler between the handle and the primary winding. A plurality of indentations are formed in the side of the housing.

The charge port comprises a ferrite core and a ferrite winding disposed adjacent to the ferrite core that is coupled to the propulsion battery of the electric vehicle. An opening is provided at the front of the charge port into which the inductive charging coupler is inserted. A plurality of flexible fingers are provided that protrude from the opening and that engage the indentations in the side of the housing of the coupler when the coupler is inserted into the charge port. The charge port has a guide disposed along the edges of the opening. The guide includes the fingers. The guide may be made of a nylon material which has lubricating properties and reduces wear.

The coupler is designed to have a tactile feel. The tactile feel is provided by means of the two fingers protruding from the charge port that bend and snap into the indentations located in the sides of the charging coupler.

The present coupler is designed to give a user a sense of safety when the coupler is used to transfer electric power to charge the propulsion batteries of the electric vehicle. The resent coupler has a tactile feel that lets the user know that he or she has completely inserted the coupler into the mating charge port to begin inductive charging of the batteries.

The tactile feel aspect of the present invention may be used in inductive chargers for electric vehicles. The present coupler has been designed for use with a 6.6 kw charger, a 1.5 kw charger, and a 25 to 50 kw charger manufactured by the assignee of the present invention. In addition the coupler may be used with chargers that provide very high power up to 200 kw.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
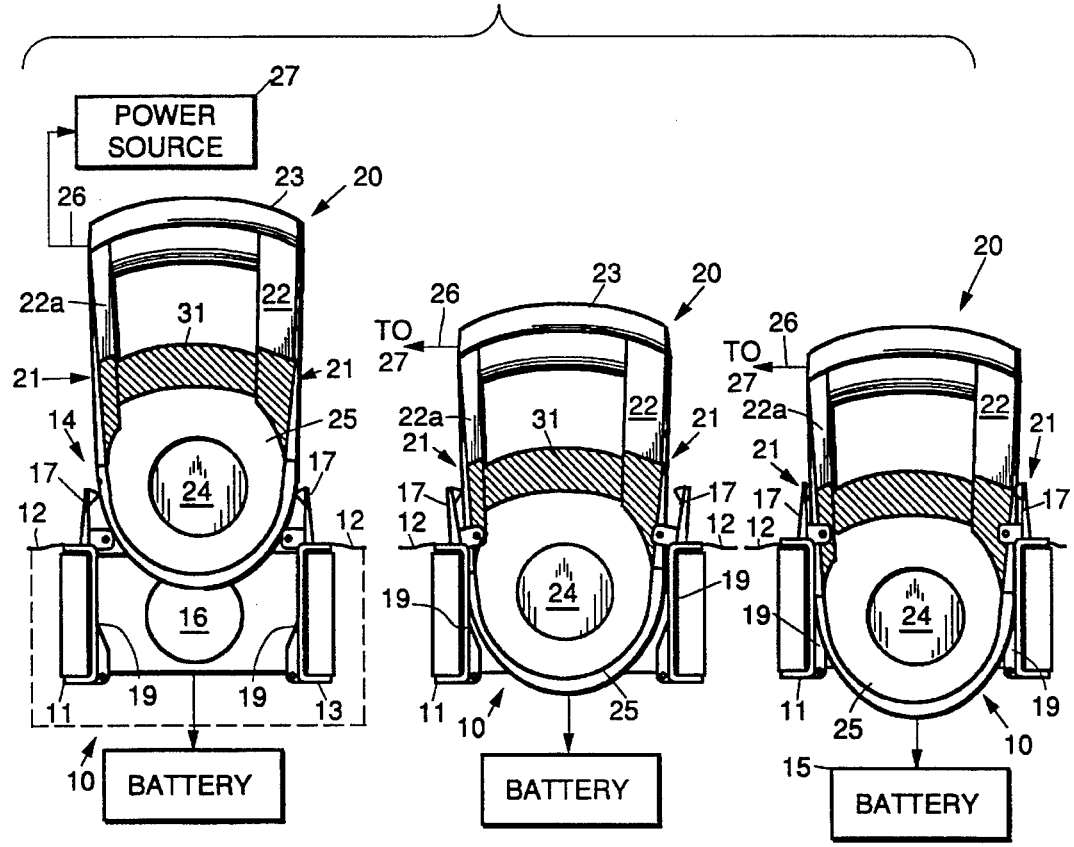
FIG. 1 shows three partially cutaway views of an inductive charging apparatus in accordance with the principles of the present invention illustrating insertion of an inductive charging coupler into a charge port.
Figure 2:
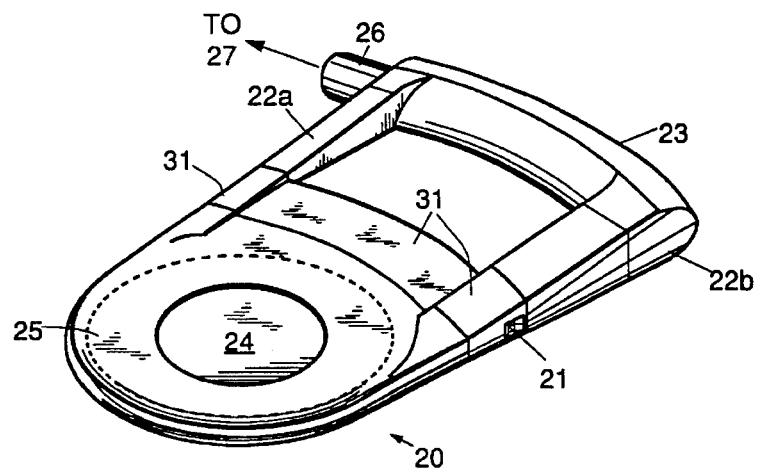
FIG. 2 is a perspective view of the inductive charging coupler employed in the inductive charging apparatus of FIG. 1.

Referring to the drawing figures, FIG. 1 shows three partially cutaway views of an inductive charging apparatus 10 in accordance with the principles of the present invention illustrating insertion of an inductive charging coupler 20 into a charge port 11 of an electric vehicle 12, for example. The charge port 11 includes a housing 13 having an opening 14 into which the inductive charging coupler 20 is inserted. The charge port 11 comprises a ferrite core 16 and secondary windings 18. The secondary windings 18 of the charge port 11 are coupled to a battery 15 of the electric vehicle 12 in which it is housed. The charge port 11 includes a plurality of spring-loaded flexible fingers 17 that mate with a corresponding plurality of indents 21 disposed on the sides of the inductive charging coupler 20. The charge port 11 has a guide 19 disposed along the edges of the opening 14. The guide 19 includes the fingers 17. The guide 19 may be made of a nylon material which has lubricating properties and reduces wear when the coupler 20 is inserted into the charge port 11.

The inductive charging coupler 20 is comprised of a coupler housing 22, which may be made from plastic, for example, that has two mating coupler halves 22a, 22b that are configured to provide a handle 23. The inductive charging coupler 20 is comprised of a center magnetic core 24 or "puck" 24, that may be comprised of ferrite, for example. A primary winding 25 is disposed around the center magnetic core 24. A charger cable 26, or other current carrying means 26, is coupled to the primary winding 25 and to an external power source 27 for coupling energy to the charging coupler 20. The charging coupler 20 is designed to be inserted into the opening 14 of the charge port 11 in order to couple current to the battery 15 from the external power source 27.

The mating coupler halves 22a, 22b of the inductive charging coupler 20 enclose the primary winding 25 and the center magnetic core 24, and secures the charger cable 26 in the handle 23. A conductive plastic strip 31 is disposed along an exterior portion of the coupler 20 between the handle 23 and the primary winding 25. The conductive plastic strip 31 engages metallized electromagnetic interference (EMI) fingers when the coupler 20 is inserted into the charge port 11.

The inductive charging apparatus 10 is designed to produce a tactile feel when the coupler 20 is inserted into the charge port 11 by a user. The tactile feel is provided by means of the two flexible fingers 17 protruding from the charge port 11 that bend and snap into the corresponding indentations 21 located in the side of the coupler 20.

Thus there has been described a new and improved inductive charging apparatus for use in charging electric vehicles, and the like, employing means for providing a tactile feel. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. Inductive charging apparatus for use in charging a battery, said apparatus comprising:
   an inductive charging coupler that comprises:
      a first magnetic core;
      a primary winding disposed around the first magnetic core;
      a charger cable coupled between the primary winding and a power source for coupling energy to the charging coupler;
      a coupler housing enclosing the primary winding and the first magnetic core; a conductive plastic strip disposed along an exterior portion of the coupler; and
      a plurality of indentations formed in the side of the housing; and
   a charge port that comprises:
      a second magnetic core;
      a secondary winding disposed adjacent to the second core that is coupled to the battery;
      an opening into which the inductive charging coupler is inserted; and
      a plurality of flexible fingers for engaging the indentations in the side of the housing of the coupler when the coupler is inserted into the charge port.

2. The inductive charging apparatus of claim 1 wherein the battery is disposed in an electric vehicle, and wherein energy is coupled from the power source to the battery of the vehicle by the inductive charging apparatus.

3. The inductive charging apparatus of claim 1 wherein the coupler housing comprises two mating coupler halves that are configured to provide a handle, and wherein the mating coupler halves enclose the primary winding and the magnetic core, and secures the charger cable in the handle.

4. The inductive charging apparatus of claim 1 wherein the plurality of flexible fingers protrude from the opening in the charge port and engage the indentations in the side of the housing of the coupler when the coupler is inserted into the charge port.

5. Inductive charging apparatus for use in charging a battery of an electric vehicle, said apparatus comprising:
   an inductive charging coupler that comprises:
      a center magnetic core;
      a primary winding disposed around the center magnetic core;
      a charger cable coupled between the primary winding and an external power source for coupling energy to the charging coupler;
      a coupler housing that has two mating coupler halves that are configured to provide a handle, and wherein the mating coupler halves enclose the primary winding and the center magnetic core, and secure the charger cable in the handle;
      a conductive plastic strip disposed along an exterior portion of the coupler between the handle and the primary winding; and
      a plurality of indentations formed in the side of the housing;
   a charge port disposed in the electric vehicle that comprises:
      a ferrite core;
      a ferrite winding disposed adjacent to the ferrite core that is coupled to the battery of the electric vehicle;
      an opening into which the inductive charging coupler may be inserted; and
      a plurality of flexible fingers that protrude from the opening and that engage the indentations in the side of the housing of the coupler when the coupler is inserted into the charge port.

\* \* \* \* \*